Nov. 21, 1961
A. J. ABS ET AL
3,009,355
DRILLING RATE RECORDER
Filed Sept. 6, 1955
4 Sheets-Sheet 2
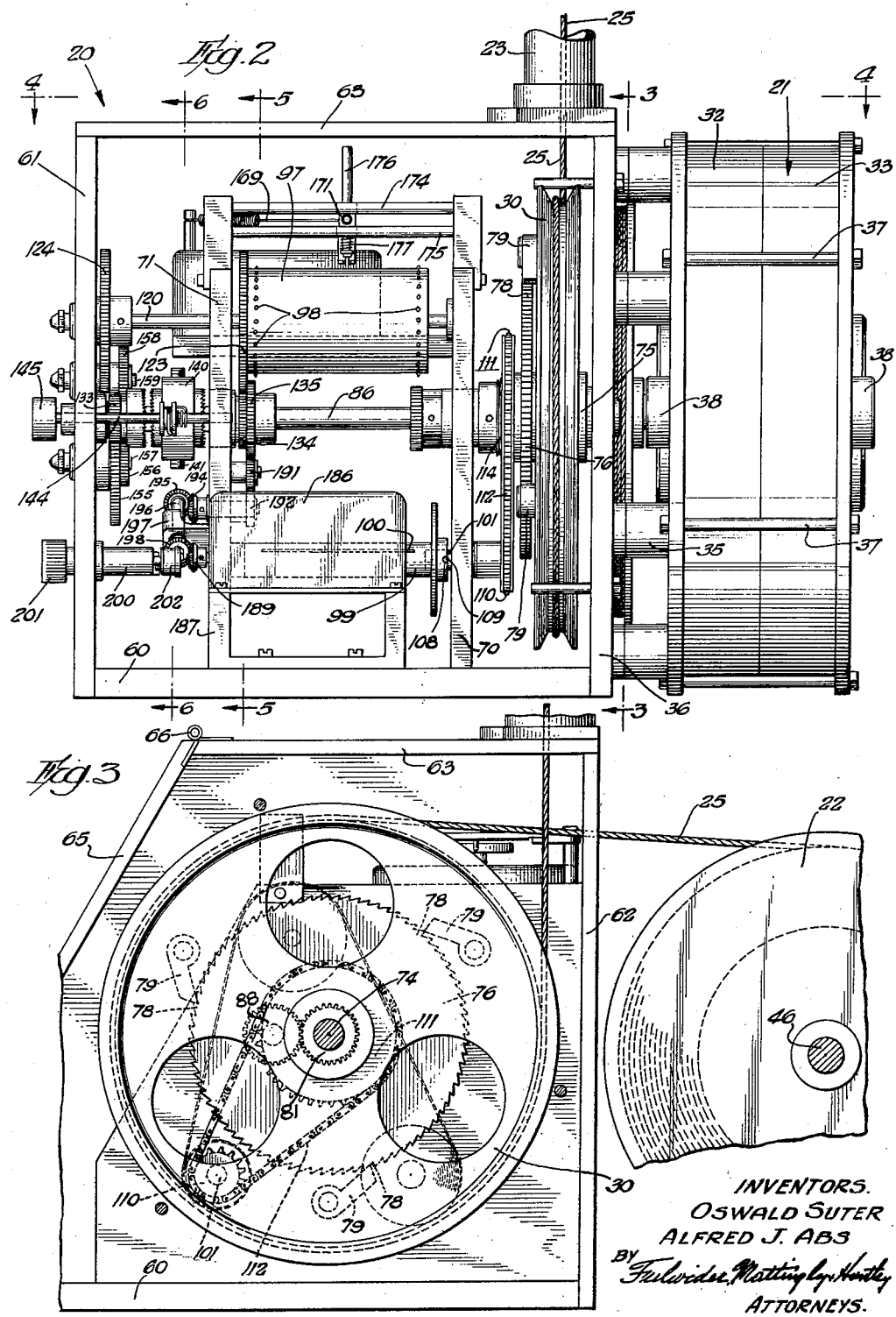
INVENTORS.
OSWALD SUTER
ALFRED J. ABS
BY Fulwider, Mattingly & Huntley
ATTORNEYS.

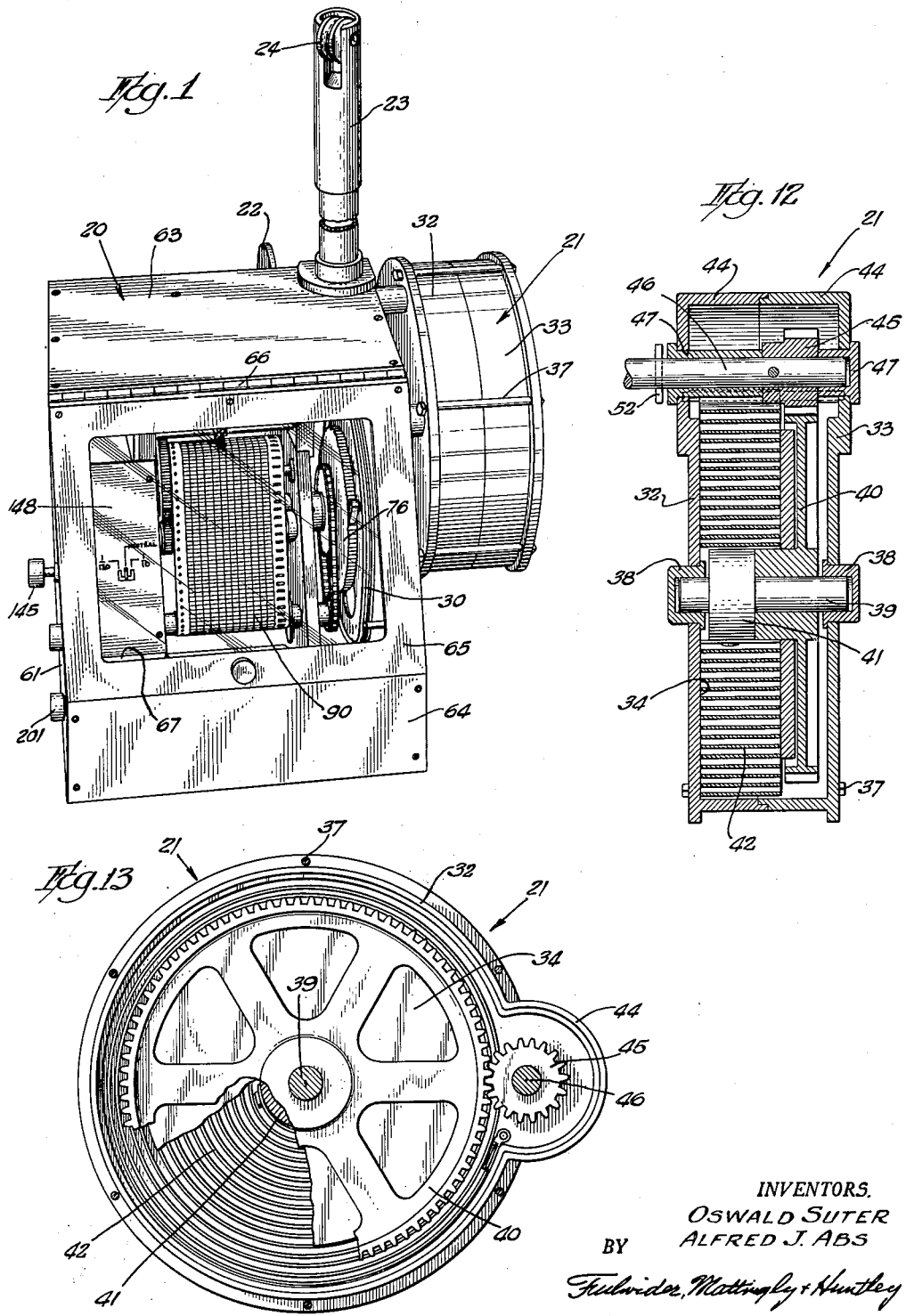

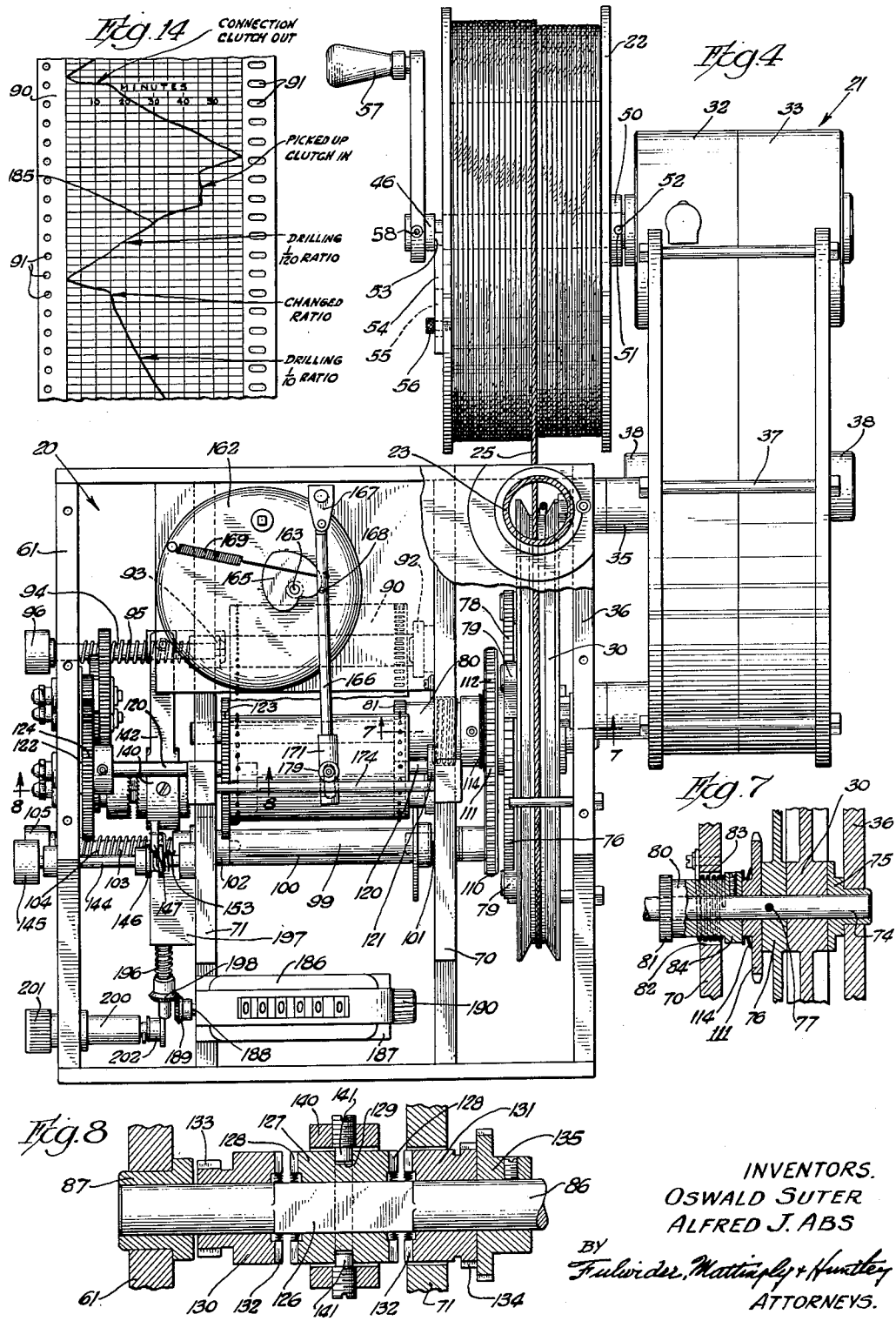

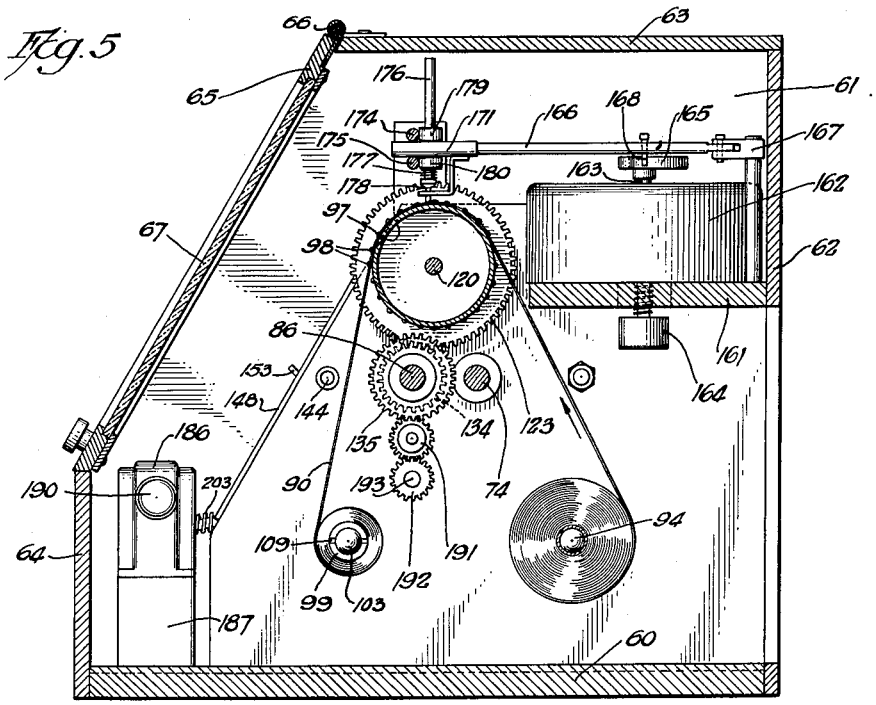

# United States Patent Office 3,009,355
Patented Nov. 21, 1961

3,009,355
DRILLING RATE RECORDER
Alfred J. Abs and Oswald Suter, Los Angeles, Calif., assignors to Technical Oil Tool Corporation, Ltd., Los Angeles, Calif., a corporation of California
Filed Sept. 6, 1955, Ser. No. 532,645
15 Claims. (Cl. 73—151.5)

This invention relates generally to drilling rate recorders and more particularly to an improved recorder which provides a very accurate expanded chart or graph of the rate of penetration through selected strata as well as normal progress chart.

An embodiment of the invention is especially useful in mining or oil drilling operations wherein highly stratified or faulted formations are encountered. For example, in certain mining areas the veins or seams of coal are interspersed between many large layers or stratas of non-productive rock. In order to make the removal of the coal economically feasible it is necessary to determine very accurately the position of the coal. In oil well exploration a similar problem may occur where the oil-bearing formations are relatively small and broken up into separated strata.

The present recorder is designed to provide a continuous graph of the rate of drilling on both a normal scale and an expanded scale, the first being used when exploring to reach the productive zones and the second being used to accurately record coring operations or other exploration through the productive zones. The graph produced is also particularly advantageous for the identification and correlation of drilling information. Briefly, the graph is made very accurate by the provision of recording mechanisms which trace rectilinear coordinates and have equal incremental movement for all portions of the trace. The information traced on the graph is also made very accurate by the provision of cooperating clutch and brake mechanisms which function as a safeguard in addition to a manually controlled throwout clutch. Should the operator fail to move the main clutch to a neutral position when not drilling, the safety mechanisms prevent retracing or obliteration of the graph traces and cause the making of trace information showing the occurrence and extent of non-drilling movement of the drilling tool.

With the foregoing in mind it is a major object of the invention to provide a drilling rate recorder which produces a highly accurate graph of the rate of drill penetration on either of two selected scales.

Another object of the invention is to provide a recorder which produces a graph having exactly rectilinear coordinates and equal incremental trace movement over the entire face of the graph.

An additional object of the invention is to provide a recorder having a main clutch for disconnecting the recorder drive during non-drilling operations and a disconnectable footage counter which can be kept in synchronism with the main recorder graph.

It is also an object of the invention to provide a recorder having a safety non-reversible drive and brake mechanism which prevents obliteration of graph traces should the operator fail to use the main clutch during non-drilling operations and provides information as to the amount of non-drilling movement.

A further object of the invention is to provide a recorder drive having a positive graph advancing means and an interconnected slip clutch drive for holding the graph paper taut on a take-up reel.

Another object of the invention is to provide a recorder drive having a quick-change gear ratio and positive drive connection throughout either of two gear trains.

It is still another object of the invention to provide a recorder having a recording stylus which is confined for rectilinear movement and actuated by a pivoted oscillating arm and rotatable cam.

A still further object of the invention is to provide a recorder having positively driven counter means for correlating the graph traces, and clutch means for disconnecting the counter means for make-up operations in the drilling string.

These and other objects and advantages of the invention will become apparent from the following detailed description of a preferred form thereof and from an inspection of the accompanying drawings in which:

FIGURE 1 is a front perspective view of the complete recorder;
FIGURE 2 is a vertical front cross section taken through the recorder;
FIGURE 3 is a side elevation partially in section taken along the line 3—3 of FIGURE 2;
FIGURE 4 is a plan view showing the interior of the recorder taken along the line 4—4 of FIGURE 2;
FIGURE 5 is a vertical section taken along the line 5—5 of FIGURE 2;
FIGURE 6 is a vertical section taken along the line 6—6 of FIGURE 2;
FIGURE 7 is a cross sectional detail taken along the line 7—7 of FIGURE 4;
FIGURE 8 is a cross sectional detail taken along the line 8—8 of FIGURE 4;
FIGURE 9 is a detail of the counter disconnect mechanism;
FIGURE 10 is a detail taken along the line 10—10 of FIGURE 6;
FIGURE 11 is a sectional detail of the stylus arm;
FIGURE 12 is a cross sectional detail of the spring motor;
FIGURE 13 is a section at right angles to the plane of FIGURE 12; and
FIGURE 14 is a view showing a portion of the recording chart.

Referring now to the drawings and particularly to FIGURES 1, 2, and 4 thereof, the instrument is contained generally within a housing 20 having affixed to one side thereof a cable winding spring motor 21 and at the rear thereof a cable storage reel or drum 22. On the top of housing 20 is a guide tube 23 having a guide pulley 24 mounted at the upper end for guiding a connecting line or cable 25 downwardly through tube 23 into the interior of the housing, and thence to storage drum 22. Motor 21 is drivingly engaged with reel 22 so that as the cable is payed in from the drilling tool it is wound or spooled tightly on the storage reel. As the line or cable 25 is payed out from storage reel 22 the rotation of the reel causes spring motor 21 to be wound and thus store energy for subsequent rewinding of the storage reel. It will be appreciated, that connecting line 25 is connected to any type of drilling tool which advances and retracts during the drilling operation. The function of the instrument is to accurately record the rate of drill penetration by plotting linear increments of drill advance against a time base. This will be explained in more detail in considering the construction and operation of the device.

As is best seen in FIGURE 4, cable 25 passes over a measuring means, in the form of a rotatable wheel 30, after extending downwardly through tube 23 and before being wound on spool 22. Wheel 30 has an accurately measured circumferential length, and each rotation thereof thus indicates the advance or retraction of the drilling tool a predetermined linear distance. As the cable 25 is payed out upon advancement of the drilling tool, it unwinds from reel 22 against the tension of spring motor 21 and is wound back upon retraction of the tool by the action of the motor. This mechanism can best be understood by considering the details of FIGURES 12 and 13.

Motor 21 has an outer drum-like housing formed of two mating inner and outer housing parts 32 and 33 which define a generally cylindrical inner chamber 34. Suitable brackets 35 support inner housing 32 on a side wall 36 of instrument housing 20, and circumferentially spaced clamping bolts 37 may be provided to secure the housing parts to each other. Mounted at the center of the motor housing are side journal or cap bearings 38 which rotatably support a central stub shaft 39. Fitted on one end of shaft 39 is a large spur gear 40 having a transversely extending hub 41. An elongated spring band 42 has its inner end affixed to hub 41 and is wound spirally around the hub with the outer end secured to the housing 32—33. Rotation of gear 40 therefore acts to store or release energy in spring 42 by tightening or releasing it from tension.

At the rear of motor 21, housing 32—33 is extended outwardly to provide a boss 44 wherein is mounted a pinion 45 on a shaft 46. The latter is rotatably supported by bearings 47 and one end of the shaft projects through the inner housing 32 for carrying cable support reel 22. At the center of reel 22 is a hollow hub 50 which fits slidably and removably over shaft 46. The end of hub 50 adjacent housing 32 has a diametral slot 51 which is adapted to engage with a diametrically extending driving pin 52 that projects through shaft 46. Thus reel 22 is connected for rotation with shaft 46 and spring motor 21.

In order to prevent reel 22 from sliding off of shaft 46, the outer end of the shaft has a locking groove 53 therein which is adapted to engage with the end of a slidable latch plate 54 mounted on the adjacent side of reel 22. Plate 54 has an elongated slot 55 therein through which extends a locking set screw 56. When it is desired to remove reel 22, set screw 56 is loosened and plate 54 is moved out of engagement with locking groove 53. Also mounted on the outer end of shaft 46 is an auxiliary winding handle 57 which is used to wind or unwind spring motor 21 when the cable is to be changed. Handle 57 is removably mounted on shaft 46 and is locked in position by a set screw 58. This completes the construction of the cable winding and driving mechanism which may be modified considerably if desired.

Returning to the interior of instrument housing 20 and referring particularly to FIGURES 2 and 3 thereof, it will be seen that the housing has a solid base plate 60 to which is secured the previously mentioned side wall 36 and a corresponding opposite side wall 61. These side walls are rectangular in shape with the front upper corner cut off at an angle. A rear wall 62 is also secured to base 60 and joins a top wall 63. On the front of the housing is a partial lower wall 64 secured rigidly in place, and an upper access door 65 which is inclined rearwardly along the angled corners of the side walls and is hinged at the top to wall 63 by means of an elongated transverse hinge 66. Door 65 may thus be opened upwardly for access into the interior of the housing.

As is best seen in FIGURE 1, door 65 is provided with a large transparent window 67 so that the operation of the recording mechanism may be observed. Window 67 also permits observation of a front counting means which is provided in addition to the graph plotting or recording means. To complete the rigid framework of the housing, a pair of parallel vertical supporting plates 70 and 71 are spaced inwardly from side walls 36 and 61, respectively, and mounted on base 60 in bisymmetrical relationship to the longitudinal axis of the housing. Plates 70 and 71 are similar in shape to walls 36 and 61, but are shorter and lower so as to be spaced from the front wall 64 and top wall 63.

As previously mentioned, the measuring wheel 30 is rotatably supported within housing 20. For this purpose an elongated main shaft 74 extends transversely across the housing between side wall 36 and the remote supporting plate 71. The ends of shaft 74 may be supported by end bearings 75 as is best seen in the detail of FIGURE 7. Wheel 30 is not fixed to shaft 74 but is free for rotation thereon. It is, however, used to drive shaft 74 by means of a one-way non-reversible drive which is best understood by considering FIGURES 3, 4 and 7 in detail.

The purpose of the one-way drive means is to rotate shaft 74 only when wheel 30 is rotated in an advancing direction corresponding to an advance of the drilling tool. When wheel 30 is rotated in the opposite direction by retraction of the drilling cable 25 shaft 74 is positively locked against rotation. This mechanism provides a safety feature against operator failure to throw the main clutch as will best be understood after the remainder of the recorder drive is considered.

Positioned adjacent to the side of measuring wheel 30 is a ratchet gear 76 which is fixed for rotation with shaft 74 as by means of a pin 77. Gear 76 has circumferentially spaced ratchet teeth 78 which are shaped to be engaged for advancement in one direction only. Mounted on the side of measuring wheel 30 are a plurality of spaced pawls 79 which are pivotally supported and spring-urged inwardly towards gear 76. The arrangement of pawls 79 and teeth 78 is such that when wheel 30 is moved in an advancing direction the pawls and teeth engage to rotate gear 76 and shaft 74, and when the wheel is rotated in the opposite direction the pawls ride over the ratchet teeth without causing any rotation of the gear.

Is should be noted that a plurality of pawls 79 are provided and are peripherally arranged so as to be sequentially advanced with respect to the pitch of teeth 78. Thus, one of pawls 79 is always ready to engage an adjacent tooth 78 in driving relationship regardless of the relative angular rotational position of wheel 30 and gear 76. In other words, in the embodiment shown using three pawls 79 and a ratchet gear 76 having approximately 80 teeth, the maximum amount of lost motion which can occur is 1.5° of angular rotation.

While the mechanism is designed so that pawls 79 will ride backwardly over teeth 78 upon reverse rotation of wheel 30, it can be appreciated that due to friction there might be some tendency of gear 76 to rotate with wheel 30 in a reverse direction. Since this would introduce an indeterminate amount of error in the synchronism of the measuring wheel and recorder drive, quick-acting brake means are provided to lock shaft 74 against any rotation in a reverse direction. As is best seen in FIGURE 7, shaft 74 carries an enlarged arbor 80 which is affixed for rotation with the shaft and has formed at its left hand end a driving gear 81. Arbor 80 passes loosely through an opening 82 formed in support plate 70 and has wound around its outer surface a helical coil spring 83 which is a close fit thereon. One end of spring 83 is secured to plate 70 and the other end lies adjacent an enlarged flange 84 formed on the arbor to limit axial movement of the spring. The turns of spring 83 are wound in such a direction that they tend to expand upon rotation of the shaft 74 in an advancing direction and thus exert little binding friction upon arbor 80. However, upon any rotation of shaft 74 in the opposite direction the coils of spring 83 contract tightly around the arbor 80 and exert a positive braking force. This braking means is more than sufficient to overcome any friction between ratchet teeth 78 and pawls 79, so that gear 76 does not move at all upon rotation of measuring wheel 30 in the reverse direction.

Mounted horizontally in front of main shaft 74 is a countershaft 86 which extends from the side wall 61 to the remote supporting plate 70. Countershaft 86 is rotatably supported at its ends by bearings 87 as is shown in the detail of FIGURE 8. Shaft 86 is connected to shaft 74, by a gear 88 mounted on said shaft 86. The gear 88 engages with gear 81 as is best seen in FIGURE 3, and revolves, of course, in the opposite direction.

The far end of shaft 86 forms a portion of a gear shifting and clutch mechanism which will subsequently be described in detail.

Before considering the remainder of the recorder drive mechanism it is advisable to point out the nature of the record chart and the means for supporting and advancing the same. A chart 90 is provided in the form of an elongated strip of paper or the like. A record is formed on chart 90 by means of a marking stylus, with footage drilled plotted longitudinally, and increments of time transversely across the chart. Sprocket holes 91 as shown in FIGURE 14 extend along the longitudinal edges of the chart paper 90 for use in advancing it with a positive motion.

A supply roll of chart paper 90 is mounted in the lower rear portion of the instrument on a pair of end roll holders 92 and 93 which are laterally spaced apart as is best seen in FIGURE 4. The right hand holder 92 is fixedly mounted to supporting plate 70 and the left hand holder 93 is mounted on the end of an elongated shaft 94 which extends slidably through plate 71 and the outer side wall 61. Shaft 94 is spring loaded inwardly by a coil spring 95 to provide tension on the roll of chart paper. The outer end of shaft 94 carries a hand knob 96 for retracting shaft 94 and holder 93 for the insertion of a new roll of chart paper 90 when needed.

The chart paper 90 passes upwardly over an advancing drum 97, having sprocket teeth 98 for engaging with holes 91, and thence downwardly to a front take-up reel or spool 99 having a slot 100 therein for receiving the leading tip of the chart paper and connecting it rotatably to the spool. The take-up spool 99 is rotatably supported at one end on a stub shaft 101 extending through plate 70 and at the other end on holder 102 which is mounted on the end of an elongated shaft 103 extending through plate 71 and side wall 61. Shaft 103 is spring-loaded inwardly by a spring 104 and has an outer hand knob 105 permitting retraction of shaft 103 and removal of take-up spool 99 when a complete roll of chart paper 90 is wound thereon.

Spool 99 is drivingly connected to shaft 101 for rotation with the shaft by means of a slot 108 and pin 109. On the outer end of shaft 101 is a sprocket 110 which is connected with a sprocket 111 mounted on shaft 74 by means of a drive chain 112, the arrangement being best seen in FIGURE 3. The purpose of take-up spool 99 is to wind chart paper 90 so that it is always taut, but it must be remembered that the advancement of the chart paper for recording is controlled by advancing drum 97 through the positive engagement of sprocket teeth 98 in holes 91. Due to the fact that the amount of chart paper 90 on spool 99 is constantly increasing, and hence the circumference of the roll is enlarging, it can be appreciated that spool 99 cannot be driven at a constant speed corresponding to the speed of advancing drum 97. For this reason, drive sprocket 111 is not positively connected to drive shaft 74 but is engaged therewith by friction drive means as is best seen in FIGURE 7.

Sprocket 111 is loose upon shaft 74 but is urged against the side of the ratchet gear 76 by a spring 114 which is confined between the sprocket and the arbor flange 84. There is a large surface area of contact between sprocket 111 and gear 76 so that the sprocket will normally move with gear 76 in an advancing direction. However, if take-up reel 99 attempts to move the chart paper 90 faster than it is being advanced by drum 97 it can be understood that sprocket 111 is free to slip against gear 76 and thus avoid tearing or over-advancement of the paper. However, take-up reel 99 will be rotated sufficiently so as to always keep the chart paper 90 under some tension. Since sprocket 111 is driven by ratchet gear 76 it will also be seen that the drive for reel 99 is unidirectional and operates only upon advancement of the drilling tool.

Advancement drum 97 is mounted upon a shaft 120 which is supported at one end by a bearing 121 mounted in plate 70 and at the other end by a bearing 122 mounted in side wall 61. Drum 97 is fixed on shaft 120 and rotates with it at all times. The sprocket teeth 98 are arranged on the circumference of the drum in spaced rows in alignment with chart holes 91, and the chart 90 is thus positively advanced over the drum upon rotation thereof. It should also be noted that shaft 120 carries two driving gears affixed thereon, a large spur gear 123 mounted adjacent one end of drum 97 and a similar gear 124 at the outer end adjacent side wall 61. These two gears 123 and 124 are used to selectively rotate shaft 120 and drum 97 at either one of two speeds, in proportion to the advancing movement of measuring wheel 30, but with varying rates of travel depending upon the gear ratio selected. This permits changing the longitudinal scale on chart 90 from a normal scale used for ordinary drilling to an expanded scale used in coring or other exploration work where extreme accuracy of record is required.

As will be remembered, the countershaft 86 is rotated in an advancing direction by the main drive shaft 74. The left hand end of the countershaft 86 forms part of a main clutch and selector drive mechanism which is best understood by considering FIGURES 6 and 8 in some detail. Formed on shaft 86 is a driving square 126 which is engaged with a complementally socketed driving clutch gear 127. The latter is free for axial sliding movement along the length of square 126 but is locked against rotation independently of shaft 86. At the ends of element 127 are opposed sets of driving teeth 128 and in the center thereof is a circumferential control groove 129.

Rotatably mounted on shaft 86 at the left and right end of gear 127 are selectively drivable gears 130 and 131, respectively, which have inner end facing teeth 132 adapted to mesh with gear teeth 128 upon movement of gear 127 thereagainst. It should be noted that gears 130 and 131 are axially spaced from gear 127 to provide for three control positions, a central neutral position in which gear 127 is disengaged from both driven gears and a position of selective engagement with either one of gears 130 or 131. Gears 130 and 131 also provide spur or pinion gears 133 and 134, respectively, at their outer ends which are adapted to mesh with subsequent gears of alternate gear trains for driving the advancing drum 97. Gear 130 is held against axial outward movement by shaft bearing 87, and gear 131 is similarly held against outward movement by a counter drive gear 135 which is fixedly secured to shaft 86.

In order to control the movement of clutch gear 127 a ring 140 is mounted outside of gear 127 in spaced relationship and provided with internally projecting bores or pins 141 which fit within control groove 129. Ring 140 is mounted upon the front end of a pivoted control arm 141 which is suitably secured at its rear end for pivotal movement in the horizontal plane. As arm 142 is moved back and forth, it can be seen that gear 127 is caused to move slidably along square 126 by reason of the engagement of pins 141 in groove 129. At the same time it can be appreciated that this linkage does not interfere with the rotation of gear 127 upon rotation of shaft 86.

To operate the control arm 142 a shaft 144 is slidably and rotatably mounted in side wall 61 and plate 71 in front of shaft 86 and carries on its outer end a hand knob 145. A spool 146 is mounted on the inner end of shaft 144 in front of arm 142 and the latter has a forwardly projecting finger 147 which fits within the sides of the spool so that upon axial movement of shaft 144 the arms are pivotally moved. As was mentioned, there are three positions for gear 127 and in order to hold it in one of these positions and aid the operator in controlling the selection of positions a selector plate 148 is provided. Plate 148 as is best seen in FIGURES 6 and 10 is mounted fixedly in front of spool 146 and is provided with a bottom slot 149 opening into three upper slots, a central slot 150 and left and right hand slots 151 and 152, respectively. Wound around shaft 144 is a coil spring 153 which has one end secured to the shaft and the other end projected forwardly through plate 148 and slots 148—152. Spring 153 is tensioned in a direction to urge the outer free end upwardly and into one of the vertical slots 150—152.

When spring 153 is engaged in the central slot 150, driving gear 127 is in the neutral position as shown in FIGURE 8 and is not engaged with either of the gears 130 or 131. In this position it can be understood that the driving means are disconnected from the advancing drum 97 and the chart 90 is not advanced upon movement of measuring wheel 30. When spring 153 is engaged in the left hand slot 151 gear 127 is engaged with gear 130 and similarly when the spring is engaged in right hand slot 152, gear 127 is engaged with gear 131. Engagement with one or the other of gears 130 or 131 connects the advancing drum 97 for rotation with countershaft 86 through different gear trains. As is indicated in FIGURE 10, the embodiment of the device shown is so constructed that when gear 127 is moved to the right, drum 97 is driven at a speed $\frac{1}{10}$ of that of measuring wheel 30. When gear 127 is moved to the left, drum 97 is driven at a much slower speed equal to $\frac{1}{120}$ of that of wheel 30. This, of course, is dependent upon the gear ratios of the various driving gears and may be varied as desired.

The drive from gear 131 to drum 97 can best be seen in FIGURE 2 wherein it will be noted that the spur gear 134 carried on the outer end of gear 131 is directly meshed with the gear 123 mounted on shaft 120 adjacent the left hand end of the drum. The drive from gear 130 to drum 97 is best seen in FIGURE 6. As shown therein, a gear reduction train is interposed between the gear 133 carried on the outer end of gear 130 and the driver gear 124 carried on drum shaft 120. This gear train is conventional and includes a gear 155 and pinion 156 mounted on a shaft 157 and meshed with a subsequent gear 158 mounted on a shaft 159 together with a pinion 160 which engages gear 124.

By the arrangement just described it can be seen that drum 97 can be rotated at either of two selected speeds upon advancement of the measuring wheel 30 to longitudinally advance chart paper 90. Changing the speed of rotation of drum 97 shifts the longitudinal scale on chart 90 to change the scale of the record of drill penetration thereon. For normal drilling the chart 90 is moved very slowly (by use of the gear reduction train) so that drilling footage is represented by a relatively small longitudinal distance on chart 90. For the gearing used in the preferred embodiment each foot of the chart 90 represents 120 feet of drilling footage.

When more accurate recording is desired, the chart 90 is moved relatively faster, and as described herein, each foot of the chart 90 represents only 10 feet of drilling footage. This latter expanded scale permits more accurate correlation of the rate of drill penetration with the character of the earth formation being drilled.

The record is marked on chart 90 by means of a time-controlled marking stylus which is moved transversely across the chart while the chart is itself moved longitudinally, as has been described. As is best seen in FIGURES 4 and 5, a timing clock 162 of conventional construction is supported at the rear of the housing on a table 161 extended across between plates 70 and 71. Clock 162 has an upper rotatable shaft 163 and may be provided at the bottom with a winding and setting stem 164. Shaft 163 projects vertically upwardly and carries thereon a heart-shaped timing cam 165 which is rotated at a uniform angular velocity in accordance with the passage of time. Shaft 163 is analogous to the minute hand of a conventional clock, but each revolution thereof and of cam 165 measures the passage of two hours.

Mounted slightly above cam 165 and to one side thereof is a stylus arm 166 which is pivotally supported at its rear end on a bracket 167 connected to table 161. The forward end of arm 166 is adapted to swing back and forth in the horizontal plane with a slightly arcuate motion centered about the pivotal connection to bracket 167.

Extending downwardly from arm 166 adjacent to the cam 165, is a cam follower pin 168 which rides on the periphery of the cam. A spring 169 is connected to arm 166 so as to hold follower pin 168 against cam 165 at all times.

As is best seen in FIGURE 11, arm 166 is of hollow tubular shape and fitted slidably therein is a rod 170 which is connected at its forward end to an external slidable sleeve 171. A spring 172 is confined within arm 166 and urges rod 170 and sleeve 171 forwardly. Extending transversely between support plates 70 and 71 in a position spaced just above the top of advancing drum 97 are a pair of parallel guide rods 174 and 175. These guide rods 174 and 175 bracket the forward end of sleeve 171, but permit it to move back and forth in the horizontal plane.

Extending downwardly through the front end of sleeve 171 is a removable marking stylus 176 which makes contact with the chart 90 as it passes over the top of drum 97. Stylus 176 may be a pen or pencil for making a visible trace on chart 90 and is held downwardly against the chart by a coil spring 177. A lower guide fork 178 may be mounted on sleeve 171 to hold the tip of stylus 176 more firmly in position. Also mounted on the sleeve 171 to the rear of guide rods 174 and 175, are a pair of guide rollers 179 and 180 which are adapted to ride on the side of the rods under the forward urging of spring 172.

The purpose of the construction just described is to translate the arcuate motion of arm 166 into exactly linear motion of stylus 176 so that the transverse coordinate of the record on the chart is truly representative of time, and the arcuate motion of the arm does not introduce an error in the measurement of footage drilled. In other words, the record formed on chart 90 has exactly rectilinear coordinates so that the slope of the record measured at any point is truly representative of the rate of drill penetration.

It should also be pointed out that it is desired to have uniform transverse motion of stylus 176 so that equal increments across the chart indicate equal time intervals. This is accomplished by the design of cam 165. As can be seen in FIGURE 4, the general heart shape of cam 165 causes the arm 166 to be oscillated back and forth across drum 97 and chart 90 in a repeating cycle. In addition, the exact shape of the cam is so determined as to move arm 166 pivotally at such a rate of angular movement that the stylus 176 is moved with uniform transverse motion.

The result of the foregoing factors is to produce a chart 90 having a record trace 185 thereon which is illustrated in FIGURE 14. It will be noted thereon that the chart 90 is divided into uniform transverse divisions representing intervals of 5 minutes of time with the total width of the chart scale representing one hour. Because of the shape of the timing cam 165 it can be appreciated that trace 185 moves back and forth between the edges of the chart upon the passage of succeeding hour intervals. Succeeding longitudinal divisions on chart 90 represent increments of footage drilled with the longitudinal scale being measured by the drive gear ratio selected. Because of this, it can be seen that the slope of trace 185 will be exactly representative of the rate of drill penetration.

In addition to its accuracy, the chart trace 185 indicates other useful correlating and operating information because of the cooperative relationship of the drive and clutch means previously described. In considering this it must first be understood that the device is designed to be operated only when actual drilling is taking place. Whenever actual drilling is not occurring the drive and clutch mechanism is to be placed in the neutral position by the driller so that there is no advancement of the chart 90 regardless of the amount of motion of the measuring wheel 30.

The upper horizontal section of the trace 185 designated by the legend "connection, clutch out" represents the character of the trace which will be made when the clutch is in neutral, and a drill string connection or other interruption in the course of drilling is occurring. The length of the horizontal trace will, of course, represent the actual time taken by this interruption in drilling. Following trace 185 down chart 90 it will be seen that it moves always in a descending direction, first toward one side of the chart and then the other, until a vertical trace designated by the legend "Picked up Clutch in" is reached.

Such a vertical trace is created by the fact that the drilling tool was retracted and then again advanced to the point of contact without putting the clutch in neutral. While the driller is instructed to put the clutch in neutral when causing such a movement of the drill, it can be understood that he may fail to do so through mistake, or because of some emergency condition which is out of his control.

Because of the unidirectional drive mechanism and brake means as has been described, the chart 90 never moves rearwardly but only in an advancing direction. This has two advantages when the kind of condition just described occurs. First, because the chart cannot move rearwardly there can never be any retracing over a portion of the record trace previously made. This prevents obliteration of the actual drilling record and also prevents confusion of the record by reason of the fact that the trace always moves downwardly. In other words, a record having traces moving both back and forth and up and down would be extremely difficult to interpret at a later time. Secondly, the distance which the drill was retracted and subsequently dropped back into drilling contact is measured by the length of the vertical trace and this distance can be subtracted from the recorded footage to give the actual footage drilled. For these reasons it can now be fully appreciated why the drive and advancing means are constructed in the manner described.

To complete the description of trace 185 it can be noted that on the lower portion of the trace a sharp change of slope occurs. This indicates the change of gear ratio on the drive selector and the shift in scale on the chart 90. The final steep slope is representative of that used for coring or other exploration where extreme accuracy of record is required and the expansion of the longitudinal scale aids greatly in interpreting such a trace.

To complete the instrument it may be desirable to provide a footage counter which operates independently of the chart record. To this end, a conventional digit type counter 186 is supported in the front of the housing on a bracket 187 connected to base 60. Counter 186 has a left hand drive shaft 188 on the end of which is mounted a bevel gear 189. The other end of counter 186 may have a conventional setting knob 190 projecting therefrom.

In order to connect counter 186 with the drive means, use is made of a previously mentioned counter driving gear 135 which is fixed on shaft 86 for constant rotation therewith. As is best seen in FIGURE 5, gear 135 drives a gear 191 which in turn drives a gear 192 mounted on a shaft 193 that projects outwardly through supporting plate 71. The remainder of the drive for the counter is best seen in FIGURE 6 wherein it is noted that shaft 193 carries a bevel gear 194 which meshes with a bevel gear 195 at right angles thereto.

Gear 195 is mounted on a downwardly extending shaft 196 which is rotatably and slidably supported by a bearing block 197 secured to plate 71. On the lower end of shaft 196 is a bevel gear 198 which engages with the previously mentioned bevel gear 189 mounted on the counter driving shaft. It can thus be seen that counter 186 may be positively driven in an advancing direction in accordance with the movement of shaft 86.

When the main clutch is placed in neutral it may also be desirable to disconnect counter 186. For this reason, a cam-operated clutch mechanism is incorporated in the drive train just described. As is best seen in FIGURES 4, 6 and 8, a shaft 200 is supported in side housing wall 61 at the lower end of shaft 196 and at right angles thereto. Shaft 200 is rotatable by means of an outer hand knob 201 and carries on its inner end an eccentric cam 202 which rides against the lower end of shaft 196. The latter is urged downwardly towards cam 202 by a spring 203 confined between bearing block 197 and gear 198. When shaft 196 is riding upon the low side of the cam 202 gear 198 is in a position to mesh with gear 189 as is indicated by the solid line position in FIGURE 9. When cam 202 is rotated to bring its high side against shaft 196, gear 198 is moved upwardly to the phantom line position and is no longer in engagement with gear 189 so that the counter 186 is disconnected.

While we have thus described in some detail a preferred embodiment of the invention, it will be understood that modifications of design and construction can be made without departing from the principles of the invention. Therefore, we do not wish to be restricted to the foregoing except as is defined in the appended claims.

We claim:

1. A drilling rate recorder including: measuring means adapted to be connected for measurable movement in accordance with the advancing and retracting movement of a drilling tool; drive means connected to said measuring means for rotation in accordance with the movement of said measuring means in the advancing direction; a record chart; advancing means engaged with said chart for advancing said chart; a pivotally mounted recording stylus engaged with said chart and constrained for linear movement transverse to the direction of advancing movement of said chart to trace a record thereon; time controlled means for moving said stylus back and forth in said linear transverse movement at a uniform rate; a clutch connecting said advancing means with said drive means and disconnectible therefrom; and brake means in said drive means holding said drive means positively against rotation in an opposite direction whereby when said drilling tool is retracted without disconnecting said clutch, said drive means and said advancing means are held against movement to prevent retracing over the record on said chart and loss of correlation between said chart and said drilling tool.

2. A drilling rate recorder including: measuring means adapted to be connected for measurable movement in accordance with the advancing and retracting movement of a drilling tool; drive means connected to said measuring means for rotation in accordance with the movement of said measuring means in the advancing direction; a record chart; advancing means connected to said drive means for advancing said chart longitudinally, said advancing means having a positive drive sprocket for moving said chart without slippage; a stylus arm pivotally mounted for arcuate movement across said chart transversely of the advancing movement thereof; a recording stylus connected to said arm to be radially movable therewith to thereby vary the total length of said arm; transverse guide means constraining said stylus for linear transverse movement as said arm arcuately moves across said chart; and time controlled cam means engaging with said stylus arm for moving said arm with an oscillating motion back and forth across said chart, said cam means moving said stylus at a uniform linear rate.

3. A drilling rate recorder including: measuring means adapted to be connected for measurable movement in accordance with the advancing and retracting movement of a drilling tool; drive means connected to said measuring means for rotation in accordance with the movement of said measuring means in the advancing direction; a record chart; advancing means connected to said drive means for advancing said chart longitudinally, said advancing means having a positive drive sprocket for moving said chart without slippage; a stylus arm pivotally mounted for arcuate movement across said chart transversely of the advancing movement thereof; a recording stylus connected to the free end of said arm and movable relative to said arm along the longitudinal axis of said arm; transverse guide means; rollers connected to said stylus and engaging with said guide means for constraining said stylus for linear transverse movement; time controlled cam means engaging with said stylus arm for moving said arm with an oscillating motion back and forth across said chart, said cam means moving said stylus at a uniform linear rate; and brake means in said drive means holding said drive means against rotation in an opposite direction.

4. A drilling rate recorder including: a measuring wheel adapted to be rotated upon advancement or retraction of a drilling tool; drive means connected to said measuring wheel for rotation in accordance with the movement of said measuring means in the advancing direction; a record chart formed as an elongated strip; advancing means engaged with said chart and connected to said drive means for advancing said chart longitudinally, said advancing means having high speed and low speed gear mechanisms for shifting the scale on said chart; a stylus arm pivotally mounted for arcuate movement across said chart transversely of the advancing movement thereof; a recording stylus connected to the free end of said arm and movable relative to said arm along the longitudinal axis of said arm; transverse guide means; transverse guide means rollers connected to said stylus and engaging with said guide means for constraining said stylus for linear transverse movement; and time controlled cam means engaging with said stylus arm for moving said arm with an oscillating motion back and forth across said chart, said cam means moving said stylus at a uniform linear rate.

5. A drilling rate recorder including: a measuring wheel adapted to be rotated upon advancement or retraction of a drilling tool; drive means connected to said measuring wheel for rotation in accordance with the movement of said measuring wheel in the advancing direction but being nonrotatable during the retracting movement of the drilling tool; a record chart formed as an elongated strip; advancing means engaged with said chart for advancing said chart longitudinally, said advancing means having a high speed and low speed gear mechanism for shifting the scale on said chart; a stylus arm pivotally mounted for arcuate movement across said chart transversely of the advancing movement thereof; a recording stylus connected to said arm; transverse guide means constraining said stylus for linear transverse movement; time controlled cam means engaging with said stylus arm for moving said arm with an oscillating motion back and forth across said chart, said cam means moving said stylus at a uniform linear rate; a clutch connecting said advancing means with said drive means and disconnectible therefrom; and brake means in said drive means holding said drive means positively against rotation in an opposite direction when said drilling tool is retracted without disconnecting said clutch, said drive means and said advancing means being held against movement to prevent retracing over the record on said chart and loss of correlation between said chart and said drilling tool.

6. In a drilling rate recorder: a measuring wheel adapted to be rotated upon advancement or retraction of a drilling tool; ratchet drive means connected to said measuring wheel and having a plurality of driving pawls connected to said wheel and engageable with a ratchet gear upon rotation of said wheel in an advancing direction, said pawls being spaced intermediate the pitch of the teeth on said gear in sequentially advanced arrangement to reduce the lost motion to a minimum; a record chart formed as a elongated strip; advancing means engaged with chart for advancing said chart longitudinally, said advancing means having a high speed and a low speed gear train; clutch and selector means including an axially slidable gear keyed for rotation with said drive means and a pair of spaced end gears connected with said high speed and low speed gear trains, respectively, said slidable gear being movable from a central neutral position to a position of driving engagement with either of said end gears, and means for moving said slidable gear and holding said gear in the selected position; and brake means in said drive means holding said ratchet gear against rotation when said measuring wheel rotates in a retracting direction.

7. A drilling rate recorder including: a measuring wheel adapted to be rotated upon advancement or retraction of a drilling tool; ratchet drive means connected to said measuring wheel and having a plurality of driving pawls connected to said wheel and engageable with a ratchet gear upon rotation of said wheel in an advancing direction, said pawls being spaced intermediate the pitch of the teeth on said gear in sequentially advanced arrangement to reduce the lost motion to a minimum; a record chart formed as an elongated strip; a stylus arm pivotally mounted for arcuate movement across said chart transversely of the advancing movement thereof; a recording stylus connected to said arm; transverse guide means constraining said stylus for linear transverse movement; time-controlled cam means engaging with said stylus arm for moving said arm with an oscillating motion back and forth across said chart, said cam means moving said stylus at a uniform linear rate; advancing means engaged with said chart for advancing said chart longitudinally, said advancing means having a high speed and a low speed gear train; clutch and selector means including an axially slidable gear keyed for rotation with said drive means and a pair of spaced end gears connected with said high speed and low speed gear trains, respectively, said slidable gear being movable from a central neutral to a position of driving engagement with either of said end gears, and means for moving said slidable gear and holding said gear in the selected position; and brake means in said drive means holding said ratchet gear against rotation when said measuring wheel rotates in a retracting direction.

8. A drilling rate recorder including: a measuring wheel adapted to be rotated upon advancement or retraction of a drilling tool; ratchet drive means connected to said measuring wheel and having a plurality of driving pawls connected to said wheel and engageable with a ratchet gear upon rotation of said wheel in an advancing direction, said pawls being spaced intermediate the pitch of the teeth on said gear in sequentially advanced arrangement to reduce the lost motion to a minimum; a record chart formed as an elongated strip; advancing means engaged with said chart for advancing said chart longitudinally, said advancing means having a high speed and a low speed gear train; clutch and selector means including an axially slidable gear keyed for rotation with said drive means and a pair of spaced end gears connected with said high speed and low speed gear trains, respectively, said slidable gear being movable from a central neutral position to a position of driving engagement with either of said end gears, and means for moving said slidable gear and holding said gear in the selected position; a take-up reel for said chart; means connected to said take-up reel and said drive means for moving said reel, said means having a friction drive plate engaged with said ratchet gear and slidable relative thereto for maintaining the rotation of said reel at a variable speed corresponding to the rate of advancement of said chart and the amount of said chart wound on said reel; and brake means in said drive means holding said ratchet gear against rotation when said measuring wheel rotates in a retracting direction.

9. In a drilling rate recorder: a measuring wheel adapted to be rotated upon advancement or retraction of a drilling tool; ratchet drive means connected to said measuring wheel and having a plurality of driving pawls connected to said wheel and engageable with a ratchet gear upon rotation of said wheel in an advancing direction, said pawls being spaced intermediate the pitch of the teeth on said gear in sequentially advanced arrangement to reduce the lost motion to a minimum; a record chart formed as an elongated strip; advancing means engaged with said chart for advancing said chart longitudinally, said advancing means having a high speed and low speed gear mechanism for shifting the scale on said chart; a clutch connecting said advancing means with said drive means and disconnectible therefrom; a take-up reel for said chart; means connected to said take-up reel and said drive means for moving said reel, said means having a friction drive plate engaged with said ratchet gear and slidable relative thereto for maintaining the rotation of said reel at a variable speed corresponding to the rate of advancement of said chart and the amount of said chart wound on said reel; and brake means in said drive means holding said ratchet gear against rotation when said measuring wheel rotates in a retracting direction.

10. A drilling rate recorder including: measuring means adapted to be connected for measurable movement in accordance with the advancing and retracting movement of a drilling tool; driving means connected to said measuring means for rotation in accordance with the movement of said measuring means; a record chart; advancing means connected to said driving means for advancing said chart longitudinally, said advancing means having positive drive means for moving said chart without slippage; a stylus arm pivotally mounted for arcuate movement across said chart transversely of the advancing movement thereof; a recording stylus spring-mounted to said arm to be radially movable therewith to thereby vary the total length of said arm; transverse guide means constraining said stylus for linear transverse movement as said arm arcuately moves across the chart; and time controlled cam means engaging with said stylus arm for moving said arm with an oscillating motion back and forth across said chart.

11. A drilling rate recorder including: measuring means adapted to be connected for measurable movement in accordance with the advancing and retracting movement of a drilling tool; drive means connected to said measuring means for rotation in accordance with the movement of said measuring means; a record chart; advancing means connected to said drive means for advancing said chart longitudinally, said advancing means having positive drive means for moving said chart without slippage; a stylus arm pivotally mounted for arcuate movement across said chart transversely of the advancing movement thereof; a recording stylus connected to the free end of said arm and movable relative to said arm along the longitudinal axis of said arm; transverse guide means; rollers connected to said stylus and engaging with said guide means for constraining said stylus to linear transverse movement; and time controlled cam means engaging with said stylus arm for moving said arm with an oscillating motion back and forth across said chart, said cam means moving said stylus at a uniform linear rate.

12. A drilling rate recorder including: measuring means adapted to be rotated upon advancement or retraction of a drilling tool; drive means connected to said measuring means for rotation in accordance with the movement of said measuring means upon advancement of the drilling tool; a record chart formed as an elongated strip; advancing means engaged with said chart for advancing said chart longitudinally at a first rate of movement, and at a second substantially slower rate of movement, said advancing means having a high speed and a low speed gear train for obtaining said first and slower rates of movement respectively; clutch and selector means including an axially slidable gear keyed for rotation with said drive means and a pair of spaced end gears connectible with said high speed and low speed gear trains respectively; means for moving said slidable gear and holding said gear in a selected position in which it is connectible with one of said gear trains, and means for tracing a record on said record chart including a time-controlled stylus adapted for movement across said record chart.

13. In a drilling rate recorder: a measuring wheel adapted to be rotated upon advancement or retraction of a drilling tool; drive means connected to said measuring wheel for rotation in accordance with the movement of said measuring wheel; a record chart formed as an elongated strip; advancing means engaged with said chart for advancing said chart longitudinally at a first rate of movement, and at a second substantially slower rate of movement, said advancing means having a high speed and a low speed gear train for obtaining said first and slower rates of movement respectively; clutch and selector means including an axially slidable gear keyed for rotation with said drive means and a pair of spaced end gears connected with said high speed and low speed gear trains, respectively, said slidable gear being movable from a central neutral position to a position of driving engagement with either of said end gears; means for moving said slidable gear and holding said gear in the selected position, and means for tracing a record on said record chart including a time-controlled stylus adapted for movement across said record chart.

14. A drilling rate recorder including: a measuring wheel adapted to be rotated upon advancement or retraction of a drilling tool; drive means connected to said measuring wheel for rotation in accordance with the movement of said measuring means in the advancing direction; a record chart formed as an elongated strip; advancing means engaged with said chart for advancing said chart longitudinally, said advancing means having a high speed and a low speed gear train for shifting the scale on said chart; clutch and selector means including an axially slidable gear keyed for rotation with said drive means and a pair of spaced end gears connectible with said high speed and low speed gear trains respectively; means for moving said slidable gear and holding said gear in a selected position in which it is connectible with one of said gear trains; brake means in said drive means holding said drive means against rotation in an opposite direction whereby said drilling tool is retracted without disconnecting said clutch, said drive means and said advancing means are held against movement to prevent retracing over the record on said chart and loss of correlation between said chart and said drilling tool; and time-controlled stylus means for tracing a record on said record chart.

15. A drilling rate recorder including: a measuring wheel adapted to be rotated upon advancement or retraction of a drilling tool; drive means connected to said measuring wheel for rotation in accordance with the movement of said measuring wheel in the advancing direction, said measuring wheel being freely rotatable with respect to said drive means during the retracting movement of the drilling tool; a record chart formed as an elongated strip; advancing means engaged with said chart for advancing said chart longitudinally, said advancing means having a high speed gear train and a separate low speed gear train for shifting the rate of movement on said chart from a first rate of movement to a second substantially different rate of movement, said advancing means also including clutch and selector means connectible with one only of said gear trains at a given time whereby one only of said gear trains is drivingly engaged at said given time; a clutch connecting said advancing means with said drive means and disconnectible therefrom; brake means in said drive means positively holding said drive means against rotation in an opposite direction whereby when said drilling tool is retracted without disconnecting said clutch, said drive means and said advancing means are positively held against movement to prevent retracing over the record on said chart and loss of correlation between said chart and said drilling tool; and means for tracing a record on said record chart including a time-controlled stylus adapted for movement across said record chart.

References Cited in the file of this patent

UNITED STATES PATENTS

| | | |
|---|---|---|
| 1,077,533 | Kenny | Nov. 4, 1913 |
| 1,918,388 | Ferguson | July 18, 1933 |
| 2,287,819 | Nichols | June 30, 1942 |
| 2,326,219 | Hayward | Aug. 10, 1943 |
| 2,330,752 | Sikes | Sept. 28, 1943 |
| 2,591,993 | Aijala | Apr. 8, 1952 |
| 2,600,336 | Scivally | June 10, 1952 |
| 2,733,599 | Storm | Feb. 7, 1956 |
| 2,740,291 | Brown | Apr. 3, 1956 |
| 2,831,347 | Yancey | Apr. 22, 1958 |
| 2,860,509 | Phillips | Nov. 18, 1958 |
| 2,883,256 | Nichols | Apr. 21, 1959 |